United States Patent
Van Dijk et al.

(10) Patent No.: US 8,810,214 B2
(45) Date of Patent: Aug. 19, 2014

(54) MULTI-MODE POWER SUPPLY CIRCUIT WITH A NORMAL OPERATIONAL MODE AND A PASS-THROUGH OPERATIONAL MODE AND A METHOD FOR OPERATING THE MULTI-MODE POWER SUPPLY CIRCUIT

(75) Inventors: Luc Van Dijk, Kranenburg (DE); Clemens Gerhardus Johannes De Haas, Ewijk (NL)

(73) Assignee: NXP B.V., Eindhoven (NL)

( * ) Notice: Subject to any disclaimer, the term of this patent is extended or adjusted under 35 U.S.C. 154(b) by 148 days.

(21) Appl. No.: 12/895,202

(22) Filed: Sep. 30, 2010

(65) Prior Publication Data

US 2012/0081086 A1    Apr. 5, 2012

(51) Int. Cl.
  *G05F 1/00*    (2006.01)
  *H02M 3/158*   (2006.01)
  *H02M 1/00*    (2006.01)

(52) U.S. Cl.
  CPC ...... *H02M 3/158* (2013.01); *H02M 2001/0045* (2013.01)
  USPC ............................ 323/266; 323/284; 323/285

(58) Field of Classification Search
  USPC ......... 323/222, 266, 268, 271, 273, 282, 284, 323/300
  See application file for complete search history.

(56) References Cited

U.S. PATENT DOCUMENTS

| | | | |
|---|---|---|---|
| 7,057,378 B2* | 6/2006 | Oyama et al. | 323/268 |
| 7,084,612 B2* | 8/2006 | Zinn | 323/266 |
| 7,170,766 B2* | 1/2007 | Lopez et al. | 363/65 |
| 7,714,550 B2* | 5/2010 | Houk et al. | 323/272 |
| 8,013,580 B2* | 9/2011 | Cervera et al. | 323/268 |
| 2007/0290657 A1* | 12/2007 | Cretella et al. | 323/222 |
| 2009/0284240 A1* | 11/2009 | Zhang et al. | 323/285 |
| 2011/0285375 A1* | 11/2011 | Deboy | 323/299 |

* cited by examiner

*Primary Examiner* — Jue Zhang
*Assistant Examiner* — Lakaisha Jackson

(57) ABSTRACT

A power supply circuit and a method for operating a power supply circuit involves selecting a normal operational mode or a pass-through operational mode for a switched mode power supply, in the normal operational mode, converting an input voltage of a power supply circuit to an intermediate voltage using a switching regulator of the switched mode power supply, in the pass-through operational mode, disabling the switching regulator such that the input voltage of the power supply circuit is unchanged by the switching regulator and an electric current consumption of the switching regulator approaches zero, and converting the intermediate voltage or the input voltage of the power supply circuit to an output voltage using a linear voltage regulator.

17 Claims, 5 Drawing Sheets

MULTI-MODE POWER SUPPLY CIRCUIT WITH A NORMAL OPERATIONAL MODE AND A PASS-THROUGH OPERATIONAL MODE AND A METHOD FOR OPERATING THE MULTI-MODE POWER SUPPLY CIRCUIT

Embodiments of the invention relate generally to electrical systems and methods and, more particularly, to power supply circuits and methods for operating a power supply circuit.

A power supply circuit converts an input voltage to a desired output voltage. The performance of the power supply circuit can be determined by evaluating characteristics or parameters of the power supply circuit, such as standby current consumption, load response, and noise level.

A power supply circuit and a method for operating a power supply circuit involves selecting a normal operational mode or a pass-through operational mode for a switched mode power supply, in the normal operational mode, converting an input voltage of a power supply circuit to an intermediate voltage using a switching regulator of the switched mode power supply, in the pass-through operational mode, disabling the switching regulator such that the input voltage of the power supply circuit is unchanged by the switching regulator and an electric current consumption of the switching regulator approaches zero, and converting the intermediate voltage or the input voltage of the power supply circuit to an output voltage using a linear voltage regulator.

In an embodiment, a method for operating a power supply circuit involves selecting a normal operational mode or a pass-through operational mode for a switched mode power supply, in the normal operational mode, converting an input voltage of a power supply circuit to an intermediate voltage using a switching regulator of the switched mode power supply, in the pass-through operational mode, disabling the switching regulator such that the input voltage of the power supply circuit is unchanged by the switching regulator and an electric current consumption of the switching regulator approaches zero, and converting the intermediate voltage or the input voltage of the power supply circuit to an output voltage using a linear voltage regulator.

In an embodiment, a power supply circuit includes a switched mode power supply and a linear voltage regulator serially connected to the switched mode power supply. The switched mode power supply includes a switching regulator configured to convert an input voltage of the power supply circuit to an intermediate voltage when the switched mode power supply is in a normal operational mode and to be disabled such that the input voltage of the power supply circuit is unchanged by the switching regulator and an electric current consumption of the switching regulator approaches zero when the switched mode power supply is in a pass-through operational mode. The linear voltage regulator is configured to convert the intermediate voltage or the input voltage of the power supply circuit to an output voltage.

In an embodiment, a power supply circuit includes a switched mode power supply and a linear voltage regulator serially connected to the switched mode power supply. The switched mode power supply includes a switching regulator and a control circuit. The switching regulator is configured to convert an input voltage of the power supply circuit to an intermediate voltage when the switched mode power supply is in a normal operational mode and to be disabled such that the input voltage of the power supply circuit is unchanged by the switching regulator and an electric current consumption of the switching regulator approaches zero when the switched mode power supply is in a pass-through operational mode. The switching regulator includes a bypass circuit configured to disable the switching regulator when the switched mode power supply is in the pass-through operational mode. The control circuit is configured to determine a demand for an output current that flows out of the switched mode power supply, to select the normal operational mode for the switched mode power supply if the demand for the output current is determined to be high, to select the pass-through operational mode for the switched mode power supply if the demand for the output current is determined to be low, to enable the bypass circuit if the pass-through operational mode is selected, and to disable the bypass circuit if the normal operational mode is selected. The linear voltage regulator is configured to convert the intermediate voltage or the input voltage of the power supply circuit to an output voltage.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
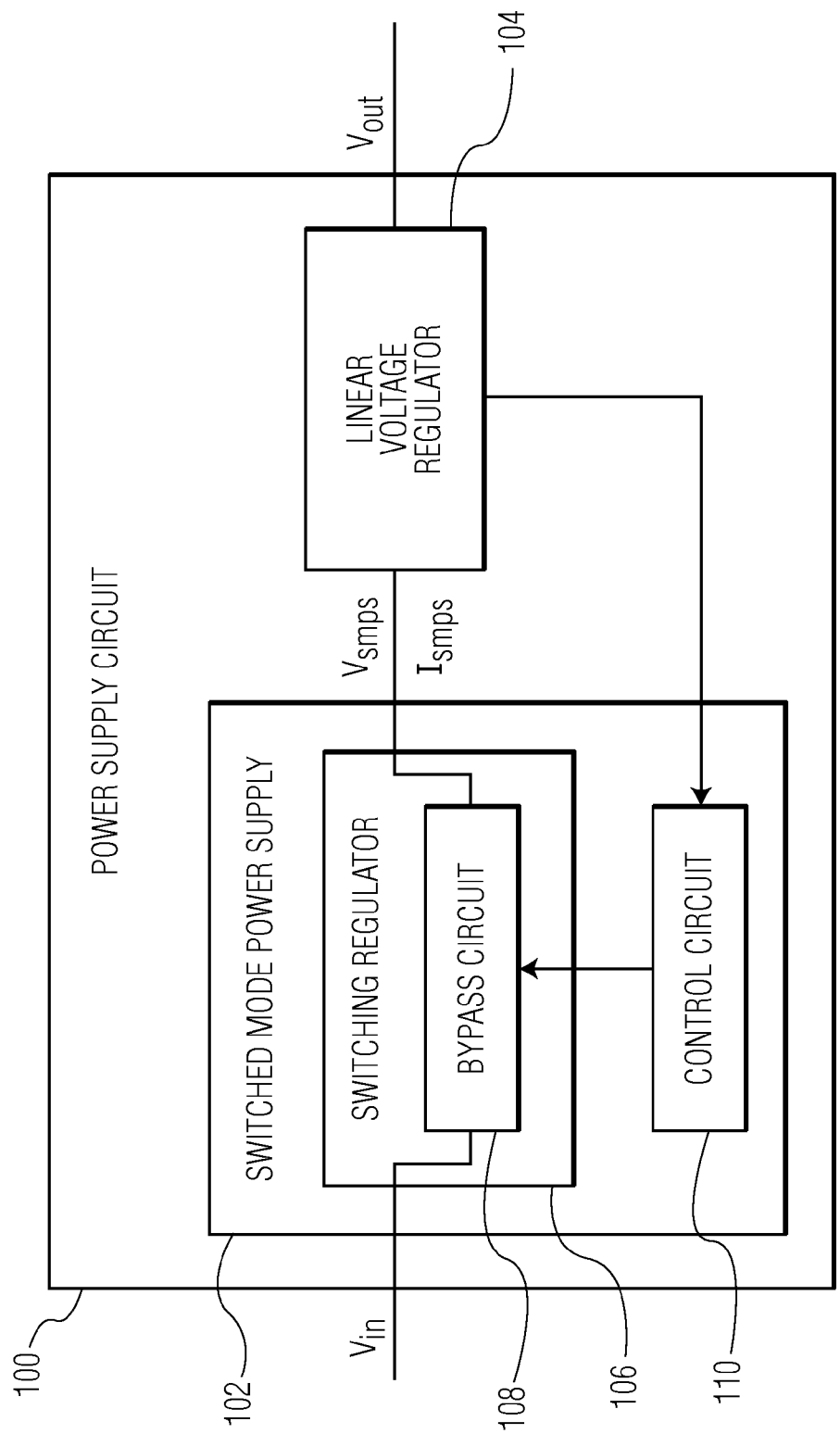
FIG. 1 is a schematic block diagram of a power supply circuit in accordance with an embodiment of the invention.

FIG. 1 is a schematic block diagram of a power supply circuit 100 in accordance with an embodiment of the invention. The power supply circuit may be used for various devices and applications, such as computers, industrial machineries, and household appliances. In some embodiments, the power supply circuit is used for an automotive application. For example, the power supply circuit is used in body controllers, anti-lock braking systems (ABS), electronic stability program (ESP) braking systems, engine management systems, and gear control systems of motor vehicles.

In the embodiment depicted in FIG. 1, the power supply circuit 100 includes a switched mode power supply 102 and a linear voltage regulator 104. The switched mode power supply of the power supply circuit includes a switching regulator 106 and a control circuit 110. Although the power supply circuit is depicted and described with certain components and functionality, other embodiments of the power supply circuit may include fewer or more components to implement less or more functionality.

Figure 2:
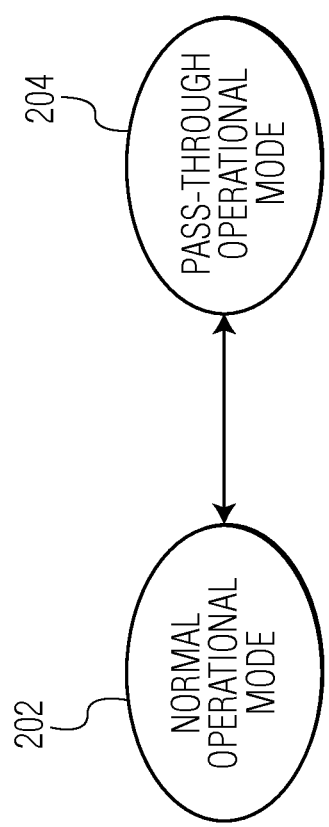
FIG. 2 illustrates a state machine diagram of the switched mode power supply depicted in FIG. 1.

The switched mode power supply 102 is configured to operate in different operational modes. FIG. 2 illustrates a state machine diagram of the switched mode power supply depicted in FIG. 1. In the state machine diagram of FIG. 2, the switched mode power supply is configured to switch between a normal operational mode 202 and a pass-through operational mode 204. The pass-through operational mode can also be referred as a standby operational mode.

Turning back to FIG. 1, the switching regulator 106 of the switched mode power supply 102 is configured to convert an input voltage "$V_{in}$" of the power supply circuit 100 to an intermediate voltage "$V_{smps}$" in the normal operational mode 202 and to be disabled such that the input voltage $V_{in}$ of the power supply circuit is unchanged by the switching regulator and an electric current consumption of the switching regulator approaches zero in the pass-through operational mode 204. The switching regulator may include circuit elements such as at least one capacitor and at least one inductor.

In the normal operational mode 202, the switched mode power supply 102 delivers the intermediate voltage $V_{smps}$, which is different from the input voltage $V_{in}$ of the power supply circuit 100, and a high output current $I_{smps}$ to the linear voltage regulator 104. The normal operational mode may be, for example, a buck operational mode or a boost operational mode. In the buck operational mode, the intermediate voltage $V_{smps}$ is lower than the input voltage $V_{in}$ of the power supply circuit. In the boost operational mode, the intermediate voltage $V_{smps}$ is higher than the input voltage $V_{in}$ of the power supply circuit. In an embodiment, the switched mode power supply includes a monitoring module (not shown) configured to monitor the input voltage $V_{in}$ and to select between the buck operational mode and the boost operational mode depending on the relationship between the input voltage $V_{in}$ and the desired output voltage level.

In the embodiment depicted in FIG. 1, the switching regulator 106 includes an internal bypass circuit 108. The bypass circuit is configured to disable the switching regulator 106 in the pass-through operational mode 204. The bypass circuit may be implemented as a single switch or serially connected switches.

In the pass-through operational mode 204, the switched mode power supply 102 delivers the input voltage $V_{in}$ of the power supply circuit 100 and a low output current $I_{smps}$, which is zero or close to zero, to the linear voltage regulator 104. The current consumption of the switched mode power supply may be limited to the leakage current of the switched mode power supply only, which is negligible. The switched mode power supply and the linear voltage regulator are the major thermal dissipators of the power supply circuit. Because the switched mode power supply and the linear voltage regulator are either disabled or carrying a very low current in the pass-through operational mode, the device junction temperature of the power supply circuit is low, which minimizes gate leakage of transistors of the power supply circuit.

The transition from the pass-through operational mode 204 to the normal operational mode 202 can increase thermal dissipation in the linear voltage regulator 104. In order to avoid thermal dissipation buildup in the linear voltage regulator, the switched mode power supply 102 may re-enter the normal operational mode after operating in the pass-through operational mode after a short time interval, e.g. below 10 milliseconds.

The control circuit 110 of the switched mode power supply 102 is configured to select the normal operational mode 202 or the pass-through operational mode 204 for the switched mode power supply. In other words, the control circuit is configured to control mode selection between the normal operational mode and the pass-through operational mode. The control circuit may be a digital circuit or an analog circuit. Although the control circuit is depicted in FIG. 1 as being external to the switching regulator 106, in other embodiments, the control circuit is integrated into the switching regulator.

The control circuit 110 may be connected to the bypass circuit 108 and to the linear voltage regulator 104 and may be further configured to determine a demand for the output current $I_{smps}$ that flows out of the switched mode power supply 102. In the embodiment depicted in FIG. 1, the output current $I_{smps}$ flows from the switched mode power supply to the linear voltage regulator 104. In some embodiments, the power supply circuit 100 includes one or more additional voltage regulator and/or load located between the switched mode power supply and the linear voltage regulator. In this case, the output current $I_{smps}$ flows from the switched mode power supply to the additional voltage regulator and/or load. The control circuit may select the normal operational mode 202 or the pass-through operational mode 204 for the switched mode power supply based on the demand for the output current $I_{smps}$. For example, the control circuit selects the normal operational mode if the demand for the output current $I_{smps}$ is high and selects the pass-through operational mode if the demand for the output current $I_{smps}$ is low. In an embodiment, the demand for the output current $I_{smps}$ is determined to be high if the demanded output current $I_{smps}$ is around or above 400 milliamp (mA) and the demand for the output current $I_{smps}$ is determined to be low if the demanded output current $I_{smps}$ is below 50 mA.

In the pass-through operational mode 204, the input voltage to the linear voltage regulator 104 is equal to the input voltage $V_{in}$ of the power supply circuit 100. Because the demand for the output current $I_{smps}$ is low, the power dissipation in the linear voltage regulator stays low even with a higher voltage drop across the linear voltage regulator, compared with the voltage drop in the normal operational mode 202.

In an embodiment, the bypass circuit 108 includes a switch (not shown) that is configured to be controlled by the control circuit 110 to disable the switching regulator 106 in the pass-through operational mode 204. In this case, the control circuit is configured to enable, i.e., close the switch if the pass-through operational mode 202 is selected and to disable, i.e. open the switch if the normal operational mode is selected.

The linear voltage regulator 104 of the power supply circuit 100 is serially connected to the switched mode power supply 102. The linear voltage regulator may include at least one transistor. For example, the linear voltage regulator includes a p-channel metal-oxide-semiconductor (PMOS) transistor or an n-channel metal-oxide-semiconductor (NMOS) transistor. In the embodiment depicted in FIG. 1, the linear voltage regulator is configured to convert the intermediate voltage $V_{smps}$ or the input voltage $V_{in}$ to an output voltage "$V_{out}$." In an embodiment, the linear voltage regulator is a low-dropout linear voltage regulator with a low output ripple. Such a low-dropout linear voltage regulator allows the output voltage $V_{out}$ to serve as a reference voltage for an analog-to-digital converter (ADC), which may be integrated into a micro controller or into a digital signal processor (DSP).

The performance of the power supply circuit 100 can be determined by evaluating characteristics or parameters of the power supply circuit, such as standby current consumption, load response, noise level, and power supply rejection ratio (PSRR). The load response of the power supply circuit may be defined as the variation of output voltage under output/load current variations. The standby current of the power supply circuit may be defined as the current consumption under zero/no demand for the output current $I_{smps}$.

By including the switching regulator 106 with the internal bypass circuit 108 and the linear voltage regulator 104 that is serially connected with the switched mode power supply, the power supply circuit 100 in the embodiment depicted in FIG. 1 is optimized for both the standby current consumption and the load response. Specifically, the pass-through operational mode 204 of the switched mode power supply allows for ultra low standby current consumption while the serially connected linear voltage regulator allows for excellent load response. As a result, the power supply circuit 100 combines the benefit of ultra low standby current consumption and the benefit of excellent load response. In addition, the power supply circuit 100 also exhibits low output voltage ripple and has a good PSRR.

Compared with a power supply circuit that includes a switched mode power supply connected in parallel to a linear voltage regulator, the power supply circuit 100 in the embodiment depicted in FIG. 1 exhibits excellent load response. For example, because the output of the switched mode power supply, which may have excessive ripples, in the parallel connected power supply circuit is directly taken as the output voltage of the power supply circuit, the output voltage of the power supply circuit cannot serve as a reference voltage for an ADC. A more severe drawback of the parallel connected power supply circuit is the load response performance. When the switched mode power supply is disabled and load current jumps from a value close to zero to a high value, the parallel connected power supply circuit needs to transit between a standby mode, in which the linear voltage regulator is enabled and the switched mode power supply is disabled and a normal mode in which the linear voltage regulator is disabled and the switched mode power supply is enabled. The time required to transition between the two modes can significantly decrease the load response performance.

In addition, compared with a power supply circuit that includes a serially connected switched mode power supply that includes a switching regulator that does not have the pass-through operational mode 204, and linear voltage regulator the power supply circuit 100 in the embodiment depicted in FIG. 1 exhibits an ultra low standby current consumption. Specifically, the switched mode power supply 102 of FIG. 1 consumes a moderate to high amount of standby current. Without the bypass circuit that can disable the switched mode power supply when the demand for the output current is low, the standby current consumed by the switched mode power supply and the linear voltage regulator cannot satisfy the low consumption requirement.

Furthermore, compared with a power supply circuit that includes only the linear voltage regulator, the power supply circuit 100 in the embodiment depicted in FIG. 1 exhibits better power dissipation. Using only the linear voltage regulator, even a moderate output current combined with a large difference between the input voltage and the output voltage of the linear voltage regulator can quickly result in large power dissipation. For example, if the linear voltage regulator is located in a typical automotive power supply, a costly and cumbersome cooling mechanism is needed to ensure the power dissipation or the desired output current has to be unnecessarily reduced.

Figure 3:
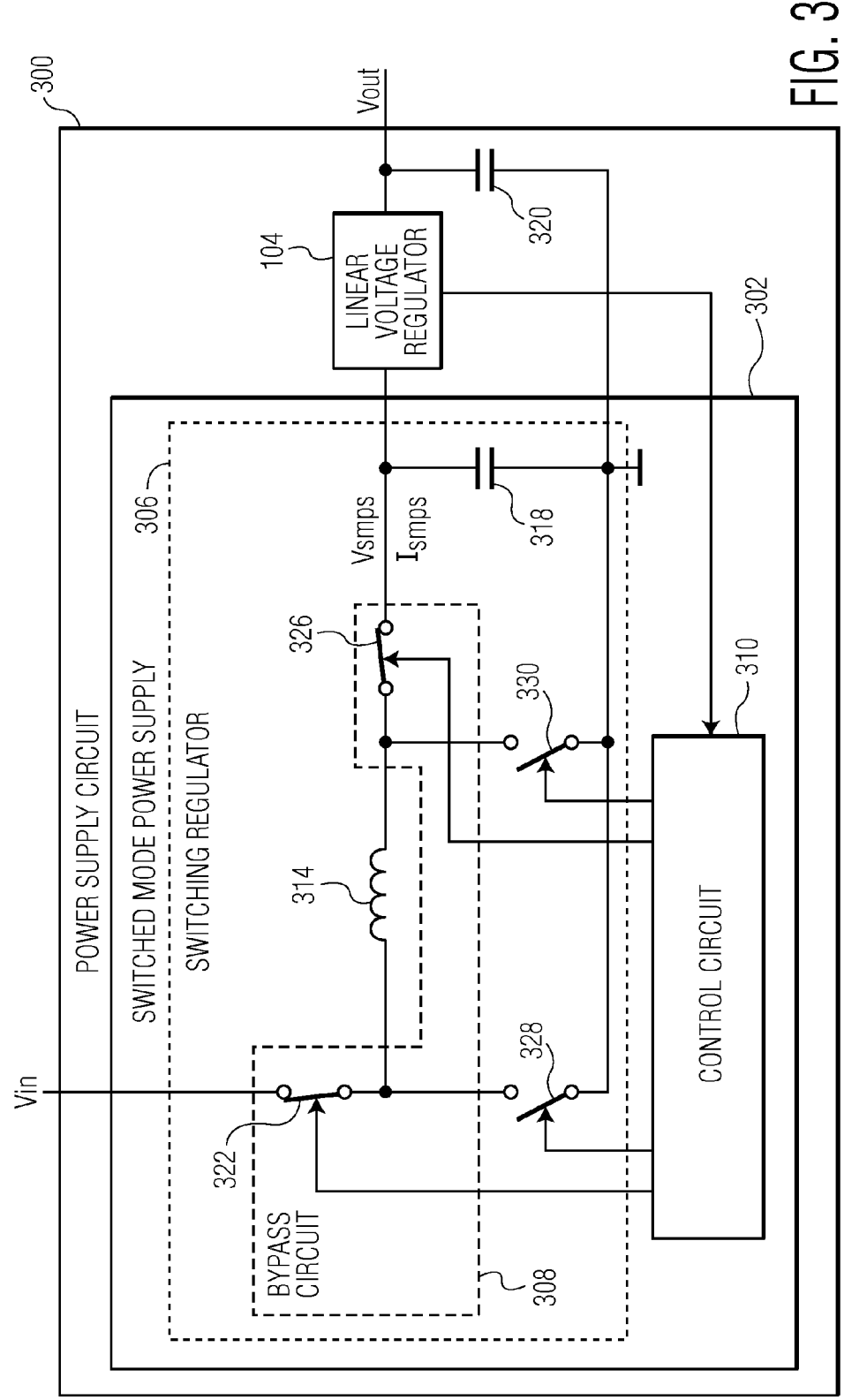
FIG. 3 depicts an embodiment of the power supply circuit of FIG. 1.

FIG. 3 depicts an embodiment of the power supply circuit 100 of FIG. 1. In the embodiment depicted in FIG. 3, the power supply circuit 300 includes a switched mode power supply 302, a linear voltage regulator 104, and a capacitor 320. The switched mode power supply includes a switching regulator 306 that includes an internal bypass circuit 308, and a control circuit 310.

The switching regulator 306 of the switched mode power supply 302 is configured to convert an input voltage $V_{in}$ to an intermediate voltage $V_{smps}$ in a normal operational mode 202 and to be disabled such that the input voltage $V_{in}$ of the power supply circuit 300 is unchanged by the switching regulator and an electric current consumption of the switching regulator approaches zero in the pass-through operational mode 204. In the embodiment depicted in FIG. 3, the switching regulator also includes an inductor 314, another capacitor 318 connected to the intermediate voltage $V_{smps}$, and switches 328, 330. In an embodiment, the inductor 314 and the capacitors 318, 320 are placed external to the power supply circuit. In an embodiment, the switches 328, 330 are realized by NMOS devices, which require less substrate area compared with PMOS devices.

The bypass circuit 308 of the switching regulator 306 is configured to disable the switching regulator 306 in the pass-through operational mode 204. In the embodiment depicted in FIG. 3, the bypass circuit includes a first switch 322 and a second switch 326. As shown in FIG. 3, the inductor 314 is connected between the first switch 322 and a second switch 326. In an embodiment, the first switch 322 and the second switch 326 are realized by NMOS devices, which require less substrate area compared with PMOS devices.

The control circuit 310 of the switched mode power supply 302 is configured to select the normal operational mode 202 or the pass-through operational mode 204 for the switched mode power supply. In the embodiment depicted in FIG. 3, the control circuit is connected to the bypass circuit 308 and to the linear voltage regulator 104 and is further configured to determine the demand for the output current $I_{smps}$ that flows out of the switched mode power supply. The control circuit may select the normal operational mode or the pass-through operational mode based on the demand for the output current $I_{smps}$. For example, the control circuit selects the normal operational mode if the demand for the output current $I_{smps}$ is high and selects the pass-through operational mode if the demand for the output current $I_{smps}$ is low. In the embodiment depicted in FIG. 3, the control circuit is connected to the switches 322, 326, 328, 330 and is further configured to enable the first switch 322 and the second switch 326 if the pass-through operational mode is selected and to operate, i.e., to switch the switches 322, 326, 328, 330 on and off depending on the difference between the actual input voltage $V_{in}$ and a desired intermediate voltage $V_{smps}$ if the normal operational mode is selected.

Figure 4:
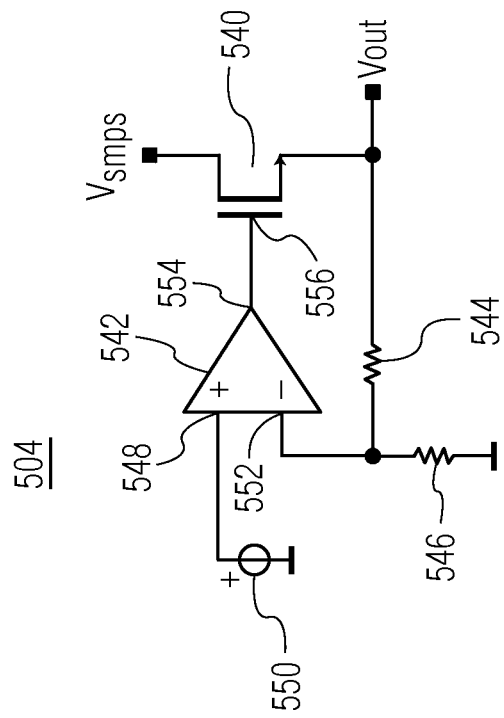
FIGS. 4 and 5 depict two embodiments of the linear voltage regulator of FIGS. 1 and 3.
Figure 5:
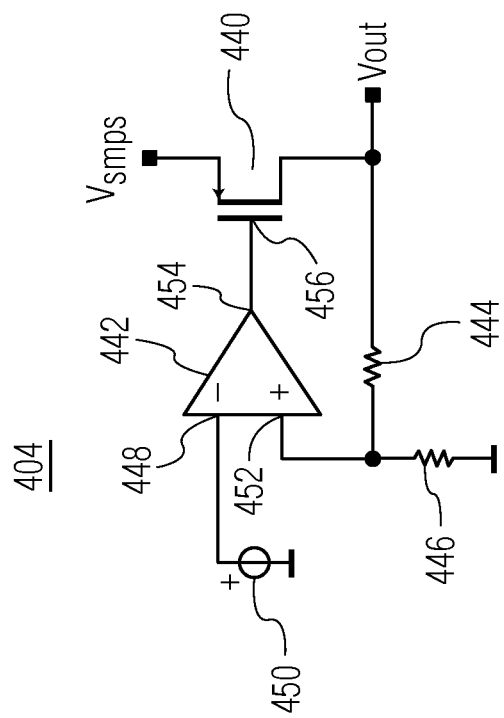

The linear voltage regulator 104 in the embodiments depicted in FIGS. 1 and 3 can be implemented using PMOS or NMOS transistor elements. FIGS. 4 and 5 depict two embodiments of the linear voltage regulator of FIGS. 1 and 3 with a PMOS transistor or a NMOS transistor.

In the embodiment depicted in FIG. 4, the linear voltage regulator 404 includes a PMOS transistor 440, a comparator 442, a first resistor 444, and a second resistor 446. The PMOS transistor 440 is connected to the switched mode power supply 102 or 302 (not shown in FIG. 4) and the output voltage $V_{out}$ of the power supply circuit 100 or 300 (not shown in FIG. 4). The comparator 442 includes an input terminal 448 connected to a reference voltage source 450, a second input terminal 452, and an output terminal 454 connected to the gate 456 of the PMOS transistor 440. The first resistor 444 is connected to the second terminal 452 of the comparator 442 and to the output voltage $V_{out}$ of the power supply circuit 100 or 300. The second resistor 446 is connected to the second terminal 452 of the comparator 442 and ground.

In the embodiment depicted in FIG. 5, the linear voltage regulator 504 includes an NMOS transistor 540, a comparator 542, a first resistor 544, and a second resistor 546. The NMOS transistor 540 is connected to the switched mode power supply 102 or 302 (not shown in FIG. 5) and the output voltage $V_{out}$ of the power supply circuit 100 or 300 (not shown in FIG. 5). The comparator 542 includes an input terminal 548 connected to a reference voltage source 550, a second input terminal 552, and an output terminal 554 connected to the gate 556 of the NMOS transistor 540. The first resistor 544 is connected to the second terminal 552 of the comparator 542 and to the output voltage $V_{out}$ of the power supply circuit 100 or 300. The second resistor 546 is connected to the second terminal 552 of the comparator 542 and ground.

Figure 6:
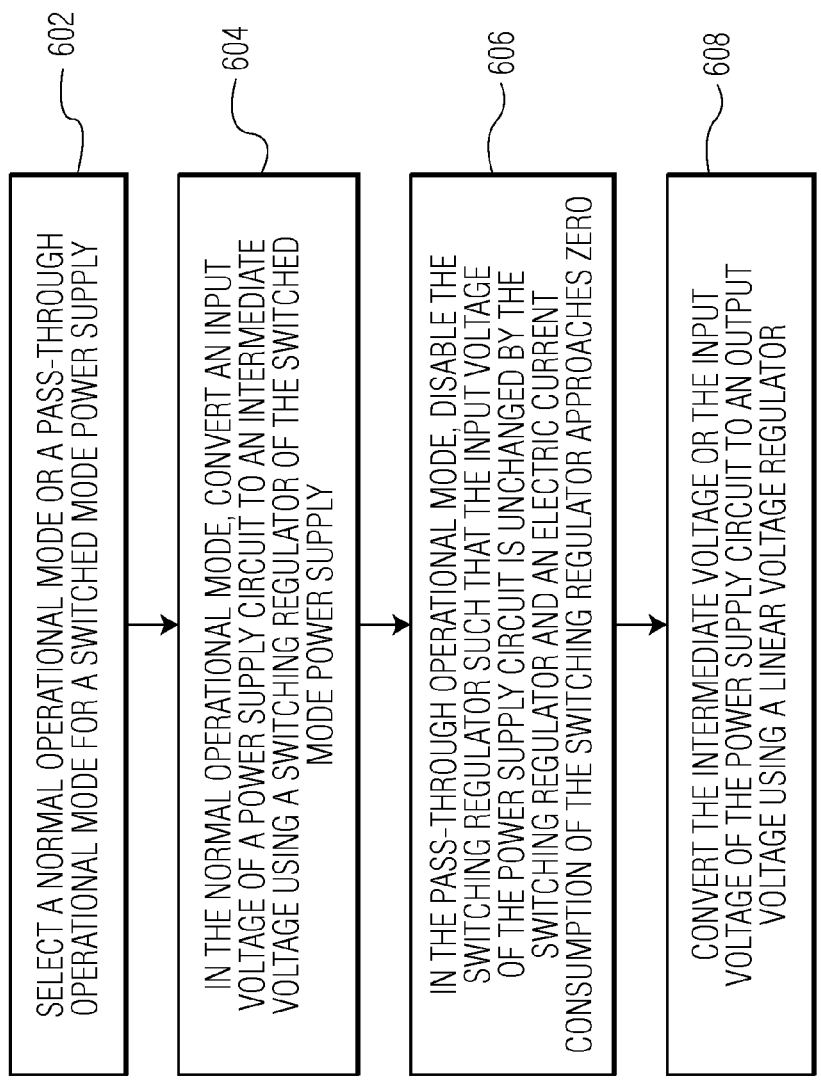
FIG. 6 is a process flow diagram of a method for operating a power supply circuit in accordance with an embodiment of the invention.

FIG. 6 is a process flow diagram of a method for operating a power supply circuit in accordance with an embodiment of the invention. At block 602, a normal operational mode or a pass-through operational mode is selected for a switched mode power supply. At block 604, in the normal operational mode, an input voltage of a power supply circuit is converted to an intermediate voltage using a switching regulator of the switched mode power supply. At block 606, in the pass-through operational mode, the switching regulator is disabled such that the input voltage of the power supply circuit is unchanged by the switching regulator and an electric current consumption of the switching regulator approaches zero. At block 608, the intermediate voltage or the input voltage of the power supply circuit is converted to an output voltage using a linear voltage regulator.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for operating a power supply circuit, the method comprising:
   selecting a normal operational mode or a pass-through operational mode for a switched mode power supply;
   in the normal operational mode, converting an input voltage of the power supply circuit to an intermediate voltage using a switching regulator of the switched mode power supply, wherein the normal operational mode is a boost operational mode in which the intermediate voltage is higher than the input voltage of the power supply circuit or a buck operational mode in which the intermediate voltage is lower than the input voltage of the power supply, wherein in the normal operational mode, converting the input voltage of the power supply circuit to the intermediate voltage comprises monitoring the input voltage and selecting between the buck operational mode and the boost operational mode depending on a relationship between the input voltage and a desired output voltage level;
   in the pass-through operational mode, disabling the switching regulator using an internal bypass circuit within the switching regulator such that the input voltage of the power supply circuit is unchanged by the switching regulator and an electric current consumption of the switching regulator approaches zero; and
   converting the intermediate voltage or the input voltage of the power supply circuit to an output voltage using a linear voltage regulator,
   wherein the selecting the normal operational mode or the pass-through operational mode is performed based on an output current demand, wherein the pass-through operational mode is selected when the current demand is substantially zero.

2. The method of claim 1, wherein selecting the normal operational mode or the pass-through operational mode for the switched mode power supply comprises determining a demand for an output current that flows out of the switched mode power supply.

3. The method of claim 2, wherein selecting the normal operational mode or the pass-through operational mode for the switched mode power supply further comprises:
   selecting the normal operational mode for the switched mode power supply if the demand for the output current is determined to be high; and
   selecting the pass-through operational mode for the switched mode power supply if the demand for the output current is determined to be low.

4. The method of claim 3, wherein selecting the normal operational mode or the pass-through operational mode for the switched mode power supply further comprises:
   enabling the internal bypass circuit if the pass-through operational mode is selected; and
   disabling the internal bypass circuit if the normal operational mode is selected.

5. A power supply circuit comprising:
a switched mode power supply comprising a switching regulator configured to convert an input voltage of the power supply circuit to an intermediate voltage when the switched mode power supply is in a normal operational mode and to be disabled using an internal bypass circuit within the switching regulator such that the input voltage of the power supply circuit is unchanged by the switching regulator and an electric current consumption of the switching regulator approaches zero when the switched mode power supply is in a pass-through operational mode, wherein the normal operational mode is a boost operational mode in which the intermediate voltage is higher than the input voltage of the power supply circuit or a buck operational mode in which the intermediate voltage is lower than the input voltage of the power supply, wherein the switching regulator comprises a monitor configured to monitor the input voltage and to select between the buck operational mode and the boost operational mode depending on a relationship between the input voltage and a desired output voltage level;
a linear voltage regulator serially connected to the switched mode power supply, wherein the linear voltage regulator is configured to convert the intermediate voltage or the input voltage of the power supply circuit to an output voltage; and
a control circuit to select between the normal operational mode and the pass-through operational mode, wherein the control circuit is configured to select the pass-through operational mode when an output current requirement is substantially zero.

6. The power supply circuit of claim 5, wherein the switched mode power supply further comprises a control circuit configured to select the normal operational mode or the pass-through operational mode for the switched mode power supply.

7. The power supply circuit of claim 6, wherein the control circuit is further configured to determine a demand for an output current that flows out of the switched mode power supply.

8. The power supply circuit of claim 7, wherein the control circuit is further configured:
to select the normal operational mode for the switched mode power supply if the demand for the output current is determined to be high; and
to select the pass-through operational mode for the switched mode power supply if the demand for the output current is determined to be low.

9. The power supply circuit of claim 6, wherein the internal bypass circuit is configured to disable the switching regulator when the switched mode power supply is in the pass-through operational mode, and wherein the control circuit is further configured:
to enable the internal bypass circuit if the pass-through operational mode is selected; and
to disable the internal bypass circuit if the normal operational mode is selected.

10. The power supply circuit of claim 9, wherein the internal bypass circuit comprises:
a first switch; and
a second switch.

11. The power supply circuit of claim 6, wherein the internal bypass circuit comprises a switch configured to disable the switching regulator when the switched mode power supply is in the pass-through operational mode, and wherein the control circuit is further configured:
to enable the switch if the pass-through operational mode is selected; and
to disable the switch if the normal operational mode is selected.

12. The power supply circuit of claim 5, wherein the linear voltage regulator comprises:
a transistor connected to the switched mode power supply and the output voltage;
a comparator, the comparator comprising:
a first input terminal connected to a reference voltage;
a second input terminal; and
an output terminal connected to a gate of the transistor;
a first resistor connected to the second terminal of the comparator and to the output voltage; and
a second resistor connected to the second terminal of the comparator and to ground.

13. The power supply circuit of claim 5, wherein the power supply circuit further comprises at least one additional voltage regulator and at least one load that are located between the switched mode power supply and the linear voltage regulator, and wherein an output current flows from the switched mode power supply to the at least one additional voltage regulator and the at least one load.

14. The power supply circuit of claim 5, wherein a first capacitor and a second capacitor are directly connected to the ground.

15. A power supply circuit comprising:
a switched mode power supply comprising a switching regulator configured to convert an input voltage of the power supply circuit to an intermediate voltage when the switched mode power supply is in a normal operational mode and to be disabled using an internal bypass circuit within the switching regulator such that the input voltage of the power supply circuit is unchanged by the switching regulator and an electric current consumption of the switching regulator approaches zero when the switched mode power supply is in a pass-through operational mode, wherein the normal operational mode is a boost operational mode in which the intermediate voltage is higher than the input voltage of the power supply circuit or a buck operational mode in which the intermediate voltage is lower than the input voltage of the power supply, wherein the switching regulator comprises a monitor configured to monitor the input voltage and to select between the buck operational mode and the boost operational mode depending on a relationship between the input voltage and a desired output voltage level, wherein the internal bypass circuit is configured to disable the switching regulator when the switched mode power supply is in the pass-through operational mode; and
a control circuit configured:
to determine a demand for an output current that flows out of the switched mode power supply;
to select the normal operational mode for the switched mode power supply if the demand for the output current is determined to be high;
to select the pass-through operational mode for the switched mode power supply if the demand for the output current is determined to be substantially zero;
to enable the internal bypass circuit if the pass-through operational mode is selected; and
to disable the internal bypass circuit if the normal operational mode is selected; and
a linear voltage regulator serially connected to the switched mode power supply, wherein the linear voltage regulator is configured to convert the intermediate voltage or the input voltage of the power supply circuit to an output voltage.

16. The power supply circuit of claim 15, wherein the linear voltage regulator comprises:
- a transistor connected to the switched mode power supply and the output voltage;
- a comparator, the comparator comprising:
  - a first input terminal connected to a reference voltage;
  - a second input terminal; and
  - an output terminal connected to a gate of the transistor;
- a first resistor connected to the second terminal of the comparator and to the output voltage; and
- a second resistor connected to the second terminal of the comparator and to ground.

17. The power supply circuit of claim 15, wherein a first capacitor and a second capacitor are directly connected to the ground.

* * * * *